United States Patent [19]

Brent et al.

[11] Patent Number: 4,744,577
[45] Date of Patent: May 17, 1988

[54] REGENERATIVE BRAKING SYSTEM FOR BICYCLES

[76] Inventors: Mark R. Brent, 285 Chiquita Ave., #3, Mountainview, Calif. 94041; Jim M. Papadopoulos, 241 Washington St., Apt. 2, Cambridge, Mass. 02139

[21] Appl. No.: 854,173

[22] Filed: Apr. 21, 1986

[51] Int. Cl.[4] .............................................. B62M 1/10
[52] U.S. Cl. ........................................ 280/215; 185/39
[58] Field of Search ............... 280/212, 215; 180/165, 180/74, 76; 185/39, 41 R

[56] References Cited

U.S. PATENT DOCUMENTS

| | | | |
|---|---|---|---|
| 234,064 | 11/1880 | Rieder | 280/215 |
| 523,638 | 7/1894 | Herrington | 280/215 |
| 1,798,971 | 3/1931 | Clements | 280/215 |
| 2,965,393 | 12/1960 | Cauchon | 280/212 |

FOREIGN PATENT DOCUMENTS

| | | | |
|---|---|---|---|
| 805990 | 12/1936 | France | 280/212 |
| 15229 | of 1892 | United Kingdom | 180/165 |
| 591216 | 8/1947 | United Kingdom | 180/165 |

*Primary Examiner*—John J. Love
*Assistant Examiner*—Charles R. Watts

[57] ABSTRACT

A regenerative braking system provides braking by transmitting the spring force of a deforming elastic medium as a torque tending to oppose the forward rotation of a wheel being braked. A brake pad assembly, mounted concentrically with the hub of a ground-engaging wheel, is actuated upon braking to provide frictional engagement between the hub and a wrapping mechanism which reels in a cable attached to an elastic medium, thereby deforming the elastic medium and storing energy, while applying a decelerating torque to the wheel. The wrapping mechanism is engaged only upon braking, and does not interfere with wheel rotation during other vehicle operating modes. Energy is accumulated until the deforming elastic reaches a limit stop, at which point continued braking is provided by frictional slippage between the brake pad and the rotating hub.

17 Claims, 3 Drawing Sheets

REGENERATIVE BRAKING SYSTEM FOR BICYCLES

TECHNICAL FIELD

The present invention relates to devices for regeneratively braking a bicycle by selectively storing braking energy and redirecting same to propel the bicycle.

BACKGROUND OF THE INVENTION

Devices for storing braking energy, and then drawing on the stored energy to accelerate, are known in the art. Most past efforts to provide regenerative braking were based on flywheels or metal springs. It has been suggested that because flywheels exhibit a far higher ratio of energy storage capacity to weight than do metal springs, flywheels would therefore be a preferred energy storage medium. See generally, Whitt et al., *Bicycling Science,* second edition, MIT Press, pp. 315-318 (1982). However, flywheel systems are heavy, require a complex continuously variable transmission to efficiently deliver energy, and have high energy dissipation due to windage and other losses.

Devices for storing energy, using a metal spring, are disclosed in U.S. Pat. No. 784,345 to Pepper, and U.S. Pat. No. 2,965,393 to Cauchon. The Pepper device has the problem of requiring a large wheel to be flipped 180 degrees for energy redelivery. Both prior art devices have the problem inherent in the use of a metal spring: a metal spring has a low energy storage capacity per unit weight, and is therefore unsuitable for use on a modern lightweight sport bicycle. Another problem of these prior art devices is their cumbersome size and location, characteristics which reduce their utility in applications affording limited space. An additional problem with these prior art devices is that their energy storing transmissions frictionally engage the tire of the vehicle's drive wheel, thereby introducing an element of lossage in braking and energy storage, caused by wear or slippage, especially under high load or adverse weather conditions. High spring forces would be necessitated in order to ensure engagement, further exacerbating wear problems. Yet another problem with the prior art devices is that no provision is made for maintaining a constant, predictable level of deceleration and acceleration force as the force of the springing medium increases and decreases during storage and delivery of energy. Further, a sudden and surprising increase in deceleration force experienced as the springing medium reaches the limit of its travel could pose a hazard to the rider, especially in braking during high speed descents or upon entering decreasing radius turns at speed.

SUMMARY OF THE INVENTION

The present invention fills these gaps in the prior art by providing a light, compact, inexpensive system for regeneratively braking a bicycle or other human-powered vehicle. The present invention provides energy-storing regenerative braking by transmitting the spring force of a deforming elastic medium as a torque tending to oppose the forward rotation of a wheel being braked. A drum/brake-pad assembly, mounted concentrically with the hub of a ground-engaging wheel, is actuated upon braking to provide frictional engagement between the hub and a wrapping mechanism which reels in a cable attached to an elastic medium, thereby deforming the elastic medium and storing energy, while applying a decelerating torque to the wheel. The wrapping mechanism is engaged only upon braking and does not interfere with wheel rotation during other vehicle operating modes. In the course of reeling in the cable, the wrapping mechanism is selectively held in position by a rider-controlled clutch mechanism, to accumulate energy over several braking events. Energy is thereby accumulated until the deforming elastic medium reaches a limit stop, at which point the wrapping mechanism is held stationary, with continued braking being provided by frictional slippage between the brake pad and the rotating hub. The rider can apply part or all stored energy by selectively releasing the rider-controlled clutch mechanism.

BRIEF DESCRIPTION OF THE DRAWINGS

These and other features of the invention will be more readily understood by consideration of the following detailed description taken with the accompanying drawings, in which.

DESCRIPTION OF SPECIFIC EMBODIMENTS

Figure 1:
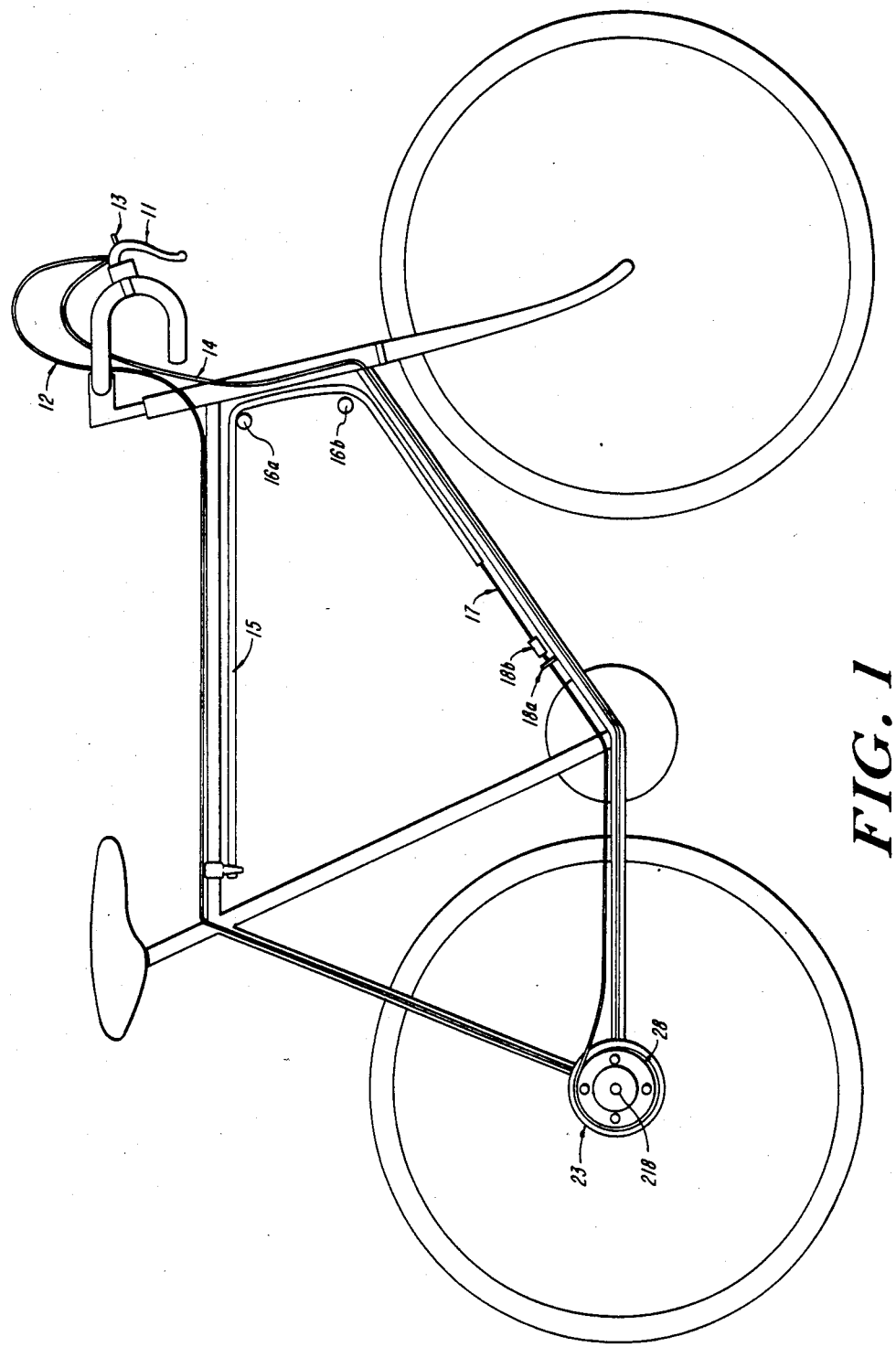
FIG. 1 presents a perspective view of an embodiment of the regenerative braking system as mounted on a bicycle.

FIG. 1 presents a perspective view of an embodiment of the regenerative braking system. The system includes elastic material 15, rigidly attached at one end to the vehicle frame, supported along its length by guide rollers 16a and 16b, and connected at its opposite end to one end of connecting cable 17. Connecting cable 17, in turn, is attached at its opposite end to the periphery of wrapping drum 28, which is rotatably mounted by way of bearings, preferably needle bearings, to axle 218.

Upon braking, the rider pulls brake lever 11, thereby causing a portion of the kinetic energy of the vehicle to be applied, in a manner described in further detail below in connection with FIG. 2, to rotate wrapping drum 28 backwards with respect to wheel hub 23. The backward rotation of wrapping drum 28 causes connecting cable 17 to be wrapped about drum 28, reducing the effective length of connecting cable 17, elongating elastic material 15 and thereby storing energy. It will be apparent from the foregoing that the spring force of elongated elastic 15 would force wrapping drum 28 to rotate in a forward direction if drum 28 were not otherwise restrained. The present invention uses the spring force of elongated elastic 15, tending to rotate drum 28 forward, to drive hub 23 forward, in a manner discussed in further detail below in connection with FIG. 2.

In a preferred embodiment, elastic material 15 is composed of a plurality of rubber bands. Rubber bands are a preferred elastic medium because they exhibit a substantially superior ratio of energy storage to weight compared to metal springs. Accordingly, significant energy storage capacity can be provided by a lightweight bundle of rubber bands. Rubber bands are also inexpensive and readily available. In addition, rubber bands are in fact seamless bands, thereby affording mounting by means of end hooks and avoiding the massive clamping forces and attendant failures that would be caused at the gripping points of clamping elements.

Figure 2:
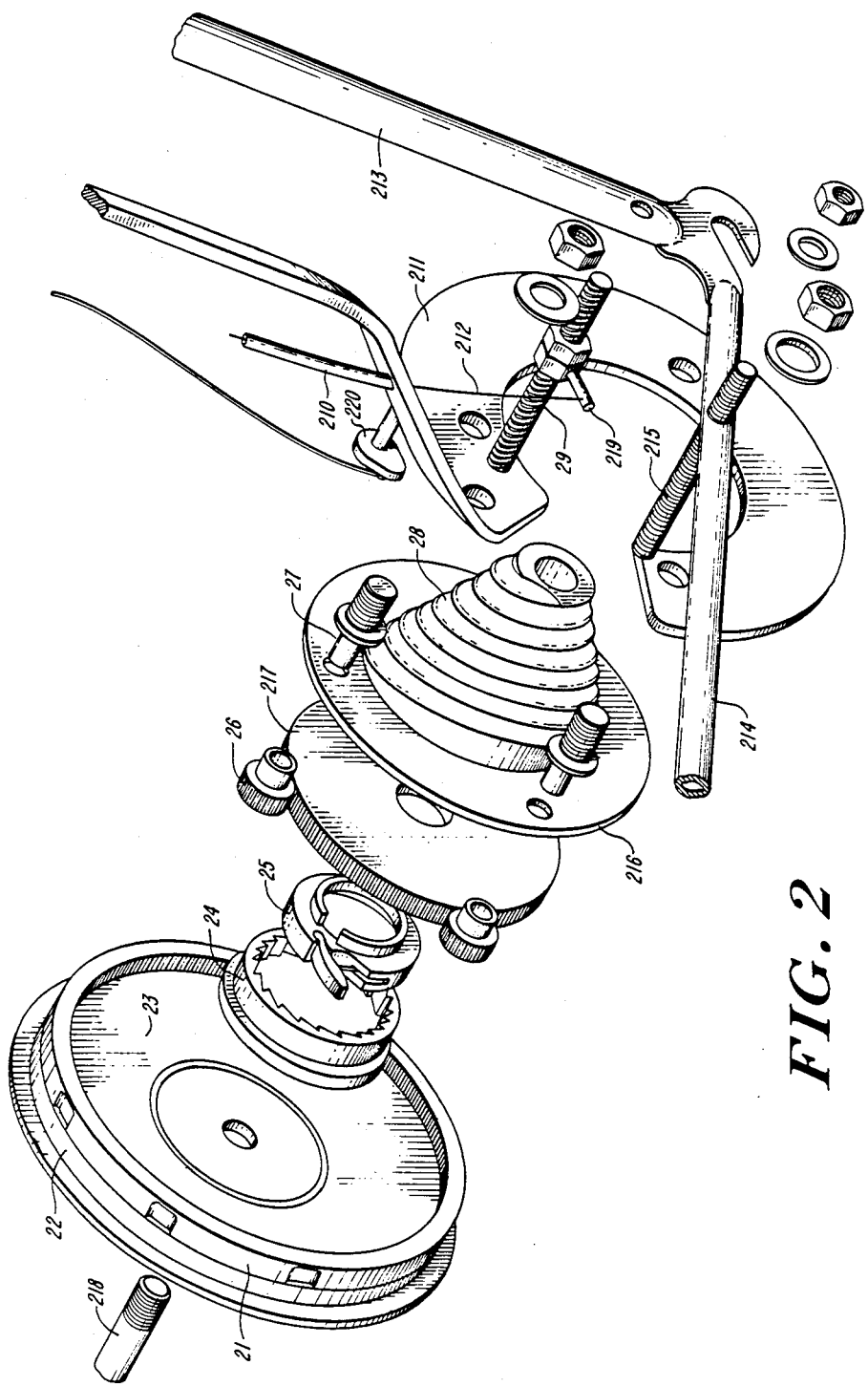
FIG. 2 shows an exploded view of the regenerative braking system of FIG. 1 and gives detail of the planetary gearset thereof.

FIG. 2 shows the manner in which a preferred embodiment of the invention accomplishes braking, and energy storage and redelivery. The system includes a brake pad 22 mounted, concentrically with axle 218, to internally toothed ring gear 21. Ring gear 21 engages a plurality of toothed planet gears 26 in a manner known in the art. Planet gears 26 are rotatably mounted on planet gear axles 27 which are fixed to reaction arm 211. Reaction arm 211 is substantially fixed relative to the frame of the vehicle, preferably at seatstay 213. Planet gears 26 engage toothed sun gear 217, which is mounted at one face to planet alignment disc 216 and in turn to wrapping drum 28, and, at its opposite face to pawls 25. Wrapping drum 28 is rotatably mounted to axle 218 by bearings, preferably needle bearings, in a conventional manner. Pawls 25 selectively engage ratchets 24 in a manner known in the art. Ratchets 24 are mounted to hub 23. Brake cable housing 210 is fixed to reaction arm 211, and brake cable 212, which passes through housing 210, is attached to braking lever 219 mounted on brake/reaction post 29. Rider-controlled clutch mechanism 220, actuated by release cable 14 and release lever 13 of FIG. 1, is mounted on reaction arm 211, and selectively engages and restrains the rotation of ring gear 21.

Upon braking, when lever 11 is pulled, brake cable 212 is tensioned, rotating braking lever 219, and pressing threaded brake/reaction post 29 to force brake pad 22 into frictional engagement with the forward-spinning hub 23. The forward rotation of hub 23 is thereby transmitted to ring gear 21, which engages and transmits torque to planet gears 26. Planet gears 26 in turn transmit torque to sun gear 217. Wrapping drum 28, mounted on sun gear 217, is thereby set rotating backward, reducing the effective length of connecting cable 17, and storing energy in elongating elastic 15. In a preferred embodiment, cable 17 is composed of a plurality of smaller diameter sub-cables. In a further preferred embodiment, wrapping drum 28 is a cone-shaped, spirally-grooved pulley known as a "fusee." The conical shape of the fusee provides one method of varying the mechanical advantage of the wrapping mechanism as the spring force of the elastic medium increases, thereby providing a constant resulting braking torque (and subsequent accelerating torque) to hub 23.

In a preferred embodiment, a limit stop is provided which would, when a predesignated spring deformation limit is reached, prevent rotation of the system components, as by restraining connecting cable 17 at some point in its travel. A preferred form of limit stop 18a and 18b is shown in FIG. 1. If cable 17 is ever would to its limit stop, wrapping drum 28 would cease rotating, and braking action would continue through frictional slippage of hub 23 relative to brake pad 22. In a preferred embodiment, brake pad 22 is constructed of neoprene.

In a further preferred embodiment, a rider-controlled one-way clutch, preferably a ratcheting device 220 of FIG. 2, is provided, having pawls which allow ring gear 21 to turn freely during braking and energy storage, but which engage and restrain the ring gear to prevent energy redelivery until selected by the rider.

To initiate energy redelivery, a rider would pull release lever 13 of FIG. 1, disengaging pawls 220 from ring gear 21 of FIG. 2, thus permitting energy redelivery. The rider can elect to redeliver part or all of the stored energy. During energy redelivery, elastic 15 contracts, pulling cable 17 and propelling fusee 28 and sun gear 217 forward. Sun gear 217 drives hub 23 directly through pawl 25 and ratchets 24, which are mounted to sun gear 217 and hub 23 respectively. During other operational modes, ratchets 24 overrun power pawls 25 in a manner known in the art.

Figure 3:
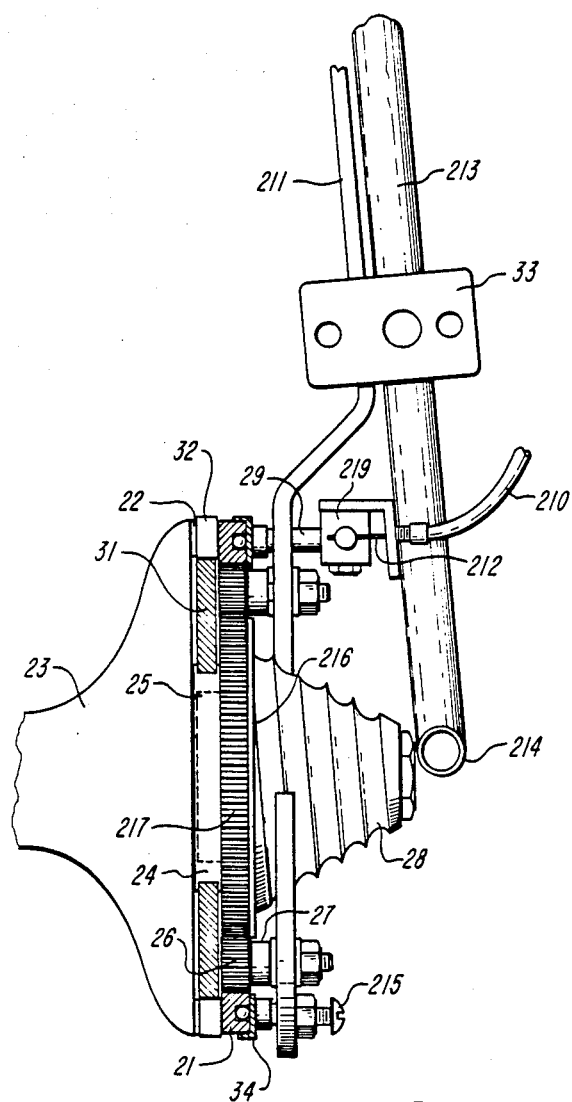
FIG. 3 shows a side view of a further illustrative embodiment.

FIG. 3 discloses ring gear alignment disc 31, which is mounted to hub 23, forming a slip fit with brake pad carrier 32 upon which brake pad 22 is mounted, and preventing excessive runout or other misalignment of ring gear 21. Planet gear alignment disc 216 contacts the hubs of planet gears 26, thereby maintaining planet gears 26 in ideal alignment with sun gear 217. Side loads exerted upon the wrapping mechanism are preferably resolved into chainstay 214 using reaction bolt 215. Bearing race alignment bolt 215 maintains bearing race 34 in alignment with hub 23 and prevents ring gear 21 from becoming skewed due to asymmetrical loads created by the action of brake post 29. Reaction arm 211 is substantially fixed to seatstay 213 by reaction plate clamp 33.

Accordingly, while the present invention has been described with particular reference to specific embodiments thereof, it will be understood that it may be embodied in a variety of forms diverse from those shown and described without departing from the spirit and scope of the invention as defined by the following claims.

We claim:

1. A regenerative braking system for a human-powered vehicle having a ground-engaging wheel including a hub rotatably mounted to an axle, for selectively storing braking energy and applying same to propel the vehicle, comprising:

energy storing elastic material having first and second ends, the first end being affixed to the vehicle, a cable having first and second cable ends, the first cable end being affixed to the second end of said elastic material, reverse wrapping means, rotatably mounted to the hub of said wheel, coaxially with said hub, said reverse wrapping means including a wrapping surface to which said second cable end is affixed, for wrapping said cable about said wrapping surface in a direction opposite that of rotation of the hub, whereby said elastic material is elongated and energy is stored;

braking means for selectively causing rotation of the wheel hub to be transmitted to the reverse wrapping means upon braking, whereby the reverse wrapping means rotates and elongates the elastic material; and transmission means for transmitting energy stored in the elastic material to the hub so as to propel the vehicle.

2. A regenerative braking system for a vehicle, comprising a rotatable ground-engaging wheel, including a hub, which when rotating in a forward direction propels said vehicle in a forward direction, elastic spring means for alternately storing and releasing energy, frictional coupling means for (i) selectively coupling said hub and said elastic spring means, (ii) transmitting to said elastic spring means, while said wheel is rotating, kinetic energy of said vehicle, so that energy is stored in said elastic spring means, and (iii) transmitting spring force from said elastic spring means to said wheel as a braking torque, and energy delivery means for selectively directing energy stored in said elastic spring means to said wheel as an acceleration torque acting in said forward direction.

3. A system according to claim 2, wherein said wheel has a circumference, and wherein said circumference substantially encompasses said frictional coupling means and said energy delivery means.

4. A system according to claim 2, wherein said energy delivery means includes control means for selectively (i) permitting and (ii) blocking delivery, to said wheel, of energy stored in said elastic spring means.

5. A system according claim 2, wherein said frictional coupling means includes means for providing a substantially constant braking torque.

6. A system according to claim 5, wherein said means for providing a constant braking torque includes fusee means for varying, with respect to wheel revolutions, incremental elongation of said at least one elastic band.

7. A system according to claim 2, wherein said elastic spring means includes at least one elastic band for alternately storing and releasing energy by alternately elongating and contracting, respectively.

8. A regenerative braking system for a vehicle, comprising:
an axle which is rigidly coupled to said vehicle,
a ground engaging wheel having a hub, said wheel being rotatably mounted with respect to said axle, and which while rotating in a forward direction propels said vehicle in a forward direction,
a wrapping drum rotatably mounted on said axle, said wrapping drum having a periphery,
elastic spring means for alternately storing and releasing energy by alternately deflecting from and returning to an initial state, respectively, said elastic spring means having first and second portions, said first portion being adapted for mounting to said vehicle, and said second portion being coupled to said periphery of said wrapping drum,
a brake pad rotatably mounted on said axle, said brake pad selectively frictionally engaging said hub,
reversing means, coupling said brake pad and said wrapping drum, for rotating said wrapping drum in a direction opposite a direction of rotation of said brake pad, so that when said brake pad is frictionally engaged against said hub of said forward-rotating wheel, said wrapping drum rotates backward, deflecting said elastic spring means and storing energy, and simultaneously transmitting spring force of said elastic spring means to said hub as a braking torque, and
energy delivery means, selectively coupling said wrapping drum and said hub, for delivering energy stored in said elastic spring means to said hub, as an acceleration torque acting in said forward direction.

9. A system according to claim 8, wherein said wrapping drum includes fusee means for varying, with respect to wheel revolutions, incremental deflection of said elastic spring means.

10. A system according to claim 9, wherein said elastic spring means includes at least one elastic band for alternately storing and releasing energy by alternately elongating and contracting, respectively.

11. A system according to claim 10, wherein said reversing means includes
a sun gear having teeth, said sun gear being rigidly mounted on said wrapping drum,
a planet gear mount which substantially encircles said sun gear and is rigidly mounted with respect to said vehicle,
at least one planet gear having teeth which mesh with those of said sun gear, said planet gear being mounted on a pin arranged within, and projecting from, a longitudinal aperture in said planet gear mount, and
a ring gear mounted to said brake pad, said ring gear including teeth which mesh with those of said at least one planet gear.

12. A system according to claim 11, wherein said energy delivery means includes
one-way clutch means for automatically (i) coupling said wrapping drum to said hub during delivery of stored energy, and (ii) permitting counterrotation of said wrapping drum relative to said hub during storage of energy.

13. A system according to claim 8, wherein said reversing means includes control means for selectively (i) permitting and (ii) blocking delivery, to said wheel, of energy stored in said elastic spring means.

14. A system according to claim 13, wherein said elastic spring means includes at least one elastic band for alternately storing and releasing energy by alternately elongating and contracting, respectively.

15. A system according to claim 14, wherein said reversing means includes
a sun gear having teeth, said sun gear being rigidly mounted on said wrapping drum,
a planet gear mount which substantially encircles said sun gear and is rigidly mounted with respect to said vehicle,
at least one planet gear having teeth which mesh with those of said sun gear, said planet gear being mounted on a pin arranged within, and projecting from, a longitudinal aperture in said planet gear mount, and
a ring gear mounted to said brake pad, said ring gear including teeth which mesh with those of said at least one planet gear.

16. A system according to claim 15, wherein said energy delivery means includes
one-way clutch means for automatically (i) coupling said wrapping drum to said hub during delivery of stored energy, and (ii) permitting counterrotation of said wrapping drum relative to said hub during storage of energy.

17. A system according to claim 8, wherein said elastic spring means includes at least one elastic band for alternately storing and releasing energy by alternately elongating and contracting, respectively.

* * * * *